United States Patent [19]
Kim

[11] Patent Number: 5,452,023
[45] Date of Patent: Sep. 19, 1995

[54] APPARATUS AND METHOD FOR STABILIZING A PICTURE OF AN IMAGE SYSTEM

[75] Inventor: Cheol-min Kim, Anyang, Rep. of Korea

[73] Assignee: Samsung Electronics Co., Ltd., Kyunggi, Rep. of Korea

[21] Appl. No.: 161,090

[22] Filed: Dec. 3, 1993

Related U.S. Application Data

[63] Continuation of Ser. No. 860,970, Mar. 31, 1992, abandoned.

[30] Foreign Application Priority Data

Jul. 8, 1991 [KR] Rep. of Korea ................. 91-11512

[51] Int. Cl.$^6$ .......................... H04N 5/44; H04N 5/50
[52] U.S. Cl. ..................... 348/731; 348/559; 348/570
[58] Field of Search ............... 348/731, 732, 733, 735, 348/728, 729, 725, 705, 726, 727, 559, 560, 569, 570; H04N 5/60, 5/44, 5/50

[56] References Cited

U.S. PATENT DOCUMENTS

| | | | |
|---|---|---|---|
| 3,872,387 | 3/1975 | Banach | 358/188 |
| 4,868,660 | 9/1989 | Rufray | 358/181 |
| 5,132,799 | 7/1992 | Gakumuka | 358/191.1 |

*Primary Examiner*—James J. Groody
*Assistant Examiner*—Michael H. Lee
*Attorney, Agent, or Firm*—Sughrue, Mion, Zinn, Macpeak & Seas

[57] ABSTRACT

Disclosed is an apparatus for and method of stabilizing a picture in an image system during the changing of a broadcast channel. Since channel altering causes noise in synchronization, and an unstable picture when performing automatic frequency tuning (AFT) and automatic gain control (AGC), an image signal of the previous channel is stored in an image memory before being changed, and output onto the screen using a switch controlled by a microcomputer during the unstable period for AFT and AGC, instead of the image signal of the altered channel. The image signal of the altered channel is output after the output of an automatic controlled is stabilized.

7 Claims, 2 Drawing Sheets

APPARATUS AND METHOD FOR STABILIZING A PICTURE OF AN IMAGE SYSTEM

This is a continuation of application Ser. No. 07/860,970 filed Mar. 31, 1992 now abandoned.

BACKGROUND OF THE INVENTION

The present invention relates to the stabilization of a received image signal in an image system, and more particularly to an apparatus for and method of stabilizing a picture during the broadcast changing of a channel.

Generally, when image signals are received in an image system such as a television or video tape recorder and a specific broadcasting channel is switched to another broadcasting channel, noise appears while the tuner is tuned to the altered channel. Also, although the tuner is tuned, the picture becomes unstable while an automatic frequency tuning (AFT) or automatic gain control (AGC) is being carried out. In order to solve these problems, an on-screen display (OSD) function is employed in a conventional image system, so that a specific color signal (blue) is displayed on screen during the changing of the channels or the absence of a signal.

However, preference for color and brightness of the image signal differs according to a user's taste. In addition, since the display of a specific color signal by the OSD function is executed only during periods of synchronous signal detection, the picture displayed on the screen becomes unstable during the AFT and AGC processes.

SUMMARY OF THE INVENTION

Therefore, it is an object of the present invention to provide a method of stabilizing a picture of an image system, wherein a picture of a channel stored prior to being altered is output during the changing of the channel, thereby stabilizing the picture.

It is another object of the present invention to provide an apparatus for stabilizing a picture of an image system during the changing of a channel.

To achieve the above and other objects of the present invention, an apparatus for stabilizing a picture of an image system comprises:

- a tuner/demodulator for receiving an external image signal, and tuning and demodulating the signal of a corresponding channel;
- an AGC circuit for automatically controlling the gain of the output signal from the tuner/demodulator;
- a sync detector for detecting a synchronizing signal with respect to the image signal of the received channel from the tuner/demodulator;
- an image memory system for storing the image signal having an automatically controlled gain in the form of a predetermined standard, and outputting the stored image signal;
- a microcomputer for outputting a first and a second state signals in accordance with an external channel altering signal input from a keypad and the synchronizing signal from the sync detector; and
- a switch for selecting any one output from the AGC circuit and the image memory system under the control of the microcomputer, wherein
- when the channel altering signal is received, the microcomputer outputs the first state signal to both the switch and image memory system, channel altering data to the tuner/demodulator after delaying for a first period, and the second state signal to both the switch and image memory after delaying for a second period.

BRIEF DESCRIPTION OF THE DRAWINGS

Other objects and advantages of the present invention will become more apparent by the following description with reference to accompanying drawings, in which.

DETAILED DESCRIPTION OF THE INVENTION

Figure 1:
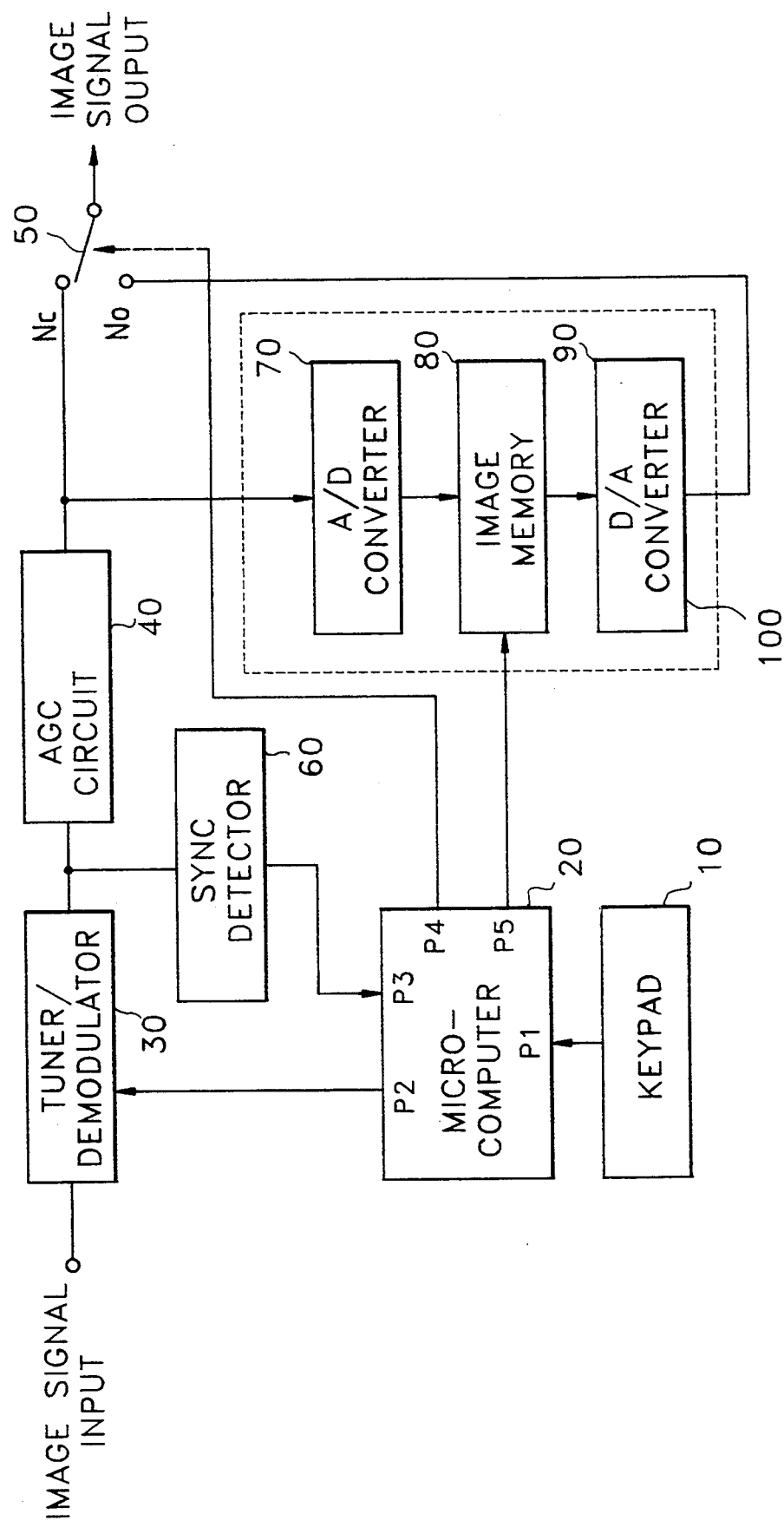
FIG. 1 is a block diagram of a system for carrying out the present invention.

Referring to FIG. 1, a system for carrying out the present invention includes: a keypad 10, as input means for changing channels and inputting various function key signals; a microcomputer 20, which outputs a first state signal through a fourth port P4 and fifth port P5 upon receiving a channel-altering signal from keypad 10 through a first port P1, channel altering data through a second port P2 after waiting for a first period to elapse, and a second state signal through fourth and fifth ports P4 and P5, respectively, by delaying for a second period when a synchronizing signal is received via a third port P3; a tuner/demodulator 30 for tuning an image signal of a channel received from second port P2 of microcomputer 20, and demodulating the received image signal to provide a demodulated image signal output; an AGC circuit 40 for automatically controlling the gain of the image signal by receiving the output of tuner/demodulator 30; a switch 50 which has a first node Nc connected to the output of AGC circuit 40 and a second node No connected to the output of a D/A converter 90 which will be described later, and switched by the output of fourth port P4 from microcomputer 20 to selectively output the output of D/A converter 90 in a first state or the output of AGC circuit 40 in a second state; a sync detector 60 connected to the output of tuner/demodulator 30 to detect a synchronizing signal with respect to the image signal of the received channel, and to output the synchronizing signal to third port P3 of microcomputer 20; and an image memory system 100 connected to the output of AGC circuit 40. Image memory system 100 includes an analog-to-digital (A/D) converter 70 for converting a gain controlled analog image signal into a digital signal; an image memory 80 whose mode is designated by the output of fifth port P5 of microcomputer 20, which stores the image signal from A/D converter 70 when the control signal is the second state signal and outputs the stored image signal when the control signal is the first state signal; and a digital-to-analog (D/A) converter 90 for converting the output of image memory 80 into an analog image signal to output the converted image signal to second node No of switch 50.

The present invention will now be described in detail with reference to the attached drawings on the basis of the above construction.

To begin with, when an arbitrary channel is selected, tuner/demodulator 30 demodulates the image signal received for the corresponding channel and outputs the demodulated image signal. AGC circuit 40 controls the gain of the image signal from tuner/demodulator 30, thereby outputting the gain-controlled image signal to first node Nc of switch 50. At this time, since switch 50 is connected to first node Nc, the gain-controlled image signal is output to a display and displayed as a picture. Also, image memory 80 is set to a storing mode by the output from fifth port P5 of microcomputer 20, so that the digital image signal of AGC circuit 30 received via A/D converter 70 is stored in accordance with a predetermined standard. Image memory 80 stores the image signal in units of frames or fields. Here, it is assumed that the image signal is stored in field units. The address signal to image memory 80 is output from microcomputer 20 (representation of the address line is omitted in FIG. 1).

As described above, while receiving the image signal of a specific channel, if the user produces another channel selecting signal through keypad 10, microcomputer 20 recognizes the channel selecting signal and sends control signals via fourth port P4 and fifth port P5 to shift switch 50 to second node No and set image memory 80 to the read-out mode. Accordingly, the image signal of the previous channel stored in image memory 80 is read out in units of fields before changing the channel, and supplied to second node No of switch 50 through D/A converter 90. This read-out mode allows the image signal to be displayed on the screen. Also, when the channel altering data is output from second port P2, tuner/demodulator 30 changes the channel to receive the image signal of the altered channel, and demodulates the received image signal.

At this time, microcomputer 20 checks whether a synchronizing signal of the altered channel is detected in the signal from tuner/demodulator 30 and supplied to third port P3 through sync detector 60. When the synchronizing signal is detected in sync detector 60, microcomputer 20 waits for the gain of the image signal of the altered channel to be controlled, then shifts switch 50 to first node Nc, and sets image memory 80 to the storing mode. As a result, during the changing of the channel, a designated image signal of the previous channel is reproduced as the picture instead of the unstable image signal received at the altered channel. Thereafter, when the image signal of the altered channel is initially stabilized, the corresponding image signal of the altered channel is output, thereby stabilizing the image signal corresponding to the altered channel is displayed on the screen once stabilized.

Figure 2:
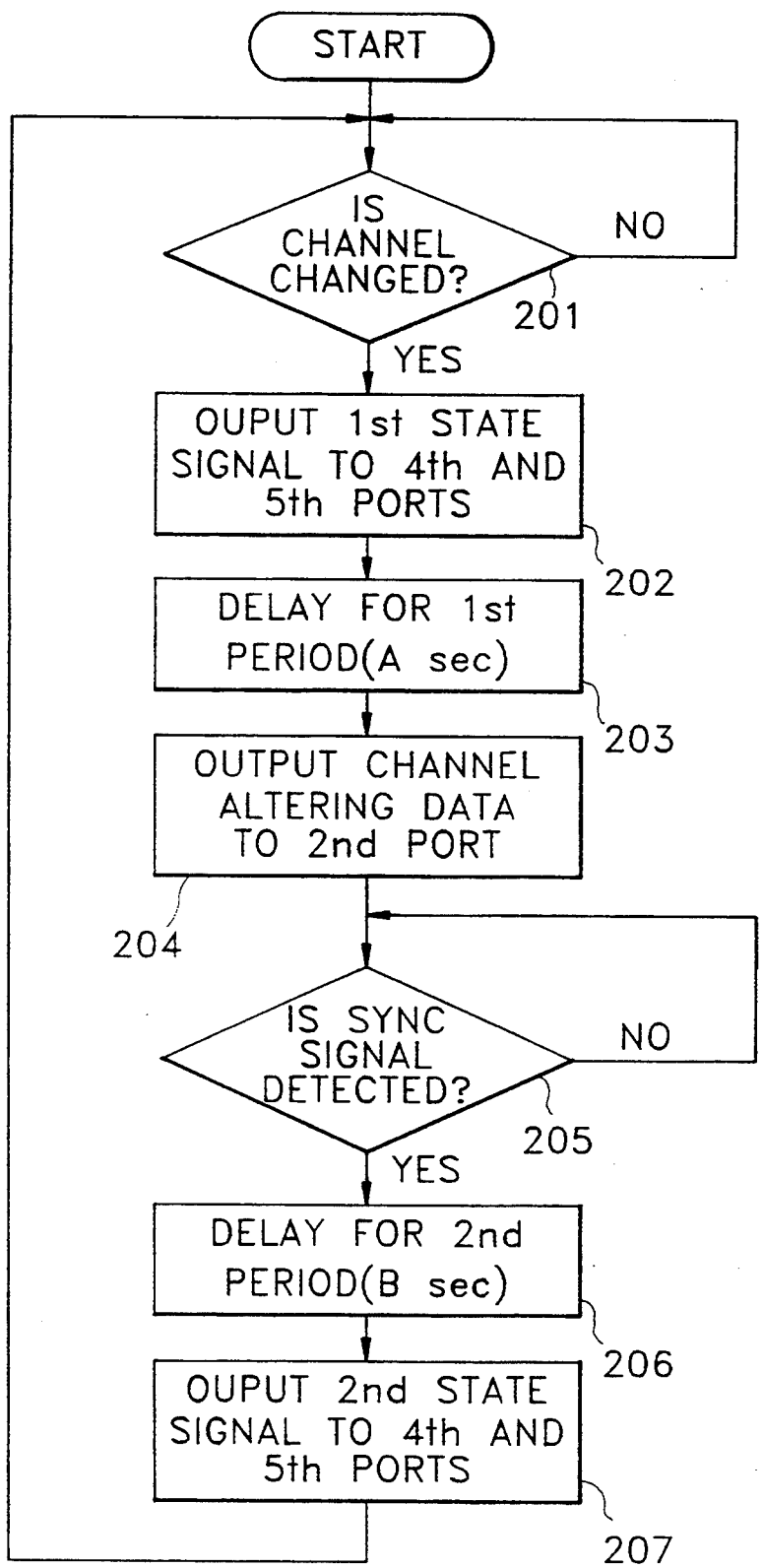
FIG. 2 is a flowchart showing a picture stabilizing process according to the present invention.

Referring to FIG. 2, the foregoing process is described in detail.

Microcomputer 20 waits for channel altering data to be received via keypad 10 (step 201). During this time, microcomputer 20 outputs data of the specific channel via second port P2, switch 50 is connected to first node Nc by the second state signal from fourth port P4, and image memory 80 is set to the storing mode by the second state signal from fifth port P5. Under these conditions, the signal displayed on the screen as the picture is the image signal from AGC circuit 40 by means of switch 50, and image memory 80 stores the output of AGC circuit 40 in units of fields.

With the circuit of FIG. 1 in the above-described state, when channel altering data is produced by the user through keypad 10, microcomputer 20 recognizes the channel altering data, and outputs the first state signal simultaneously to both fourth port P4 and fifth port P5 (step 202). Then, switch 50 is connected to second node No, thereby selecting the output of D/A converter 90, and image memory 80 is set to the read-out mode, thus outputting the stored image signal in field units. Consequently, the image signal of the previous channel which was stored in field units is output from D/A converter 90 and displayed on the screen.

After performing the above process, microcomputer 20 waits for a first period, for example, A seconds (step 203). Here, A is the time required to shift switch 50. After waiting the first period, microcomputer 20 outputs the desired channel altering data through second port P2 (step 204). By this operation, tuner/demodulator 30 demodulates the image signal corresponding to the altered channel, and outputs the demodulated signal to sync detector 60 and AGC circuit 40. In this case, since the image signal output from tuner/demodulator 30 is unstable during the changing of the channel, microcomputer 20 waits until the synchronizing signal of the altered channel is detected through third port P3 connected to the output of sync detector 60 (step 205).

When the synchronizing signal of the image signal of the altered channel is received through third port P3, microcomputer 20 waits for a second period, for example, B seconds (step 206). Here, B is the stabilizing time of AGC circuit 40 which can automatically control the gain of the image signal of the altered channel. Therefore, after detecting the synchronizing signal of the altered channel, then delaying for the second period, AGC circuit 40 is stabilized, which in turn stably controls the gain of the received image signal. Accordingly, after delaying for the second period in step 206, microcomputer 20 outputs the second state signal simultaneously to both fourth and fifth ports P4 and P5 (step 207). From these outputs, switch 50 is again shifted to first node Nc, and therefore selects the output of AGC circuit 40 for display on the screen, and image memory 80 stores the output of AGC circuit 40 in units of fields.

In the present invention as described above, the image signal received on a specific channel is output to the screen, while being stored in image memory 80. Then, when the channel is shifted to another channel, the last field of data of the previous channel stored in the image memory before changing the channel, is output to the screen. When the synchronizing signal of the image signal of the altered channel is detected, the image signal is automatically tuned by tuner/demodulator 30, thereby outputting the image signal of the previous channel stored in the image memory for a predetermined period. As a result, the image signal on the screen can be stabilized during the shifting of the channel.

What is claimed is:

1. An apparatus for stabilizing a picture in an image system comprising:

a tuner/demodulator for receiving an external image signal, and tuning and demodulating the image signal of a corresponding channel;

an AGC circuit for automatically controlling the gain of an output signal from said tuner/demodulator and outputting a gain-controlled image signal;

a sync detector for detecting a synchronizing signal with respect to said image signal of a received channel from said tuner/demodulator;

an image memory system for storing said gain-controlled image, and outputting a stored image signal;

a microcomputer for outputting a first state signal and a second state signal in accordance with an external channel altering signal and said synchronizing signal from said sync detector; and a switch for selecting one output from said AGC circuit and said image memory system under the control of said microcomputer, wherein when said external channel altering signal is received, said microcomputer outputs said first state signal to both said switch and said image memory system, outputs channel altering data to said tuner/demodulator after a first delay period, and outputs said second state signal to both said switch and image memory system after a second delay period.

2. An apparatus for stabilizing a picture in an image system as claimed in claim 1, wherein said image memory system comprises:
   an A/D converter for analog-to-digital converting the output from said AGC circuit;
   an image memory for storing a digitized image signal output from said A/D converter; and
   a D/A converter for digital-to-analog converting said stored image signal output from said image memory.

3. An apparatus for stabilizing a picture in an image system as claimed in claim 2, wherein said image signal is stored in units of any one of frames and fields.

4. An apparatus for stabilizing a picture in an image system as claimed in claim 2, wherein said image memory system stores the output signal from said A/D converter in said image memory when said first state signal is received from said microcomputer, and outputs said stored image signal from said image memory when said second state signal is received.

5. An apparatus for stabilizing a picture in an image system as claimed in claim 1, wherein said first delay period is the time taken for shifting said switch, and said second delay period is the time required for said AGC circuit to stabilize the automatic gain control of said image signal of said altered channel.

6. A method of stabilizing a picture in an image system including a tuner/demodulator for receiving a channel altering signal, an image memory for storing an image signal, and a switch having a first node and a second node for selectively connecting one of said image signal of a receiving channel and the output of said image memory to an output terminal of said image system, respectively, said method comprising the steps of:
   shifting said switch to said second node upon receiving said channel altering signal, and outputting said image signal of the previous channel from said image memory before changing said channel through said switch by setting said image memory to read-out mode;
   delaying supply of said channel altering signal to said tuner/demodulator for a predetermined period of time required for said shifting of said switch;
   changing said channel to an altered channel corresponding to channel altering data, and waiting until a synchronizing signal of said received image signal is detected in the altered channel;
   waiting until the gain of said received image signal received in said altered channel has stabilized; and
   outputting said image signal of said altered channel by shifting said switch to said first node, and successively storing said image signal of said altered channel by setting said image memory to a storing mode.

7. An display apparatus comprising:
   a tuner receiving a plurality of broadcast channels, and selectively outputting an image signal corresponding to one of the broadcast channels;
   an automatic picture control unit, coupled to said tuner, controlling picture quality of the image signal output from said tuner, and outputting a quality-controlled image signal corresponding to the image signal output from the tuner;
   image memory storing the quality-controlled image signal output from said tuner in response to a store command;
   sync detector generating a sync-control signal upon detecting a sync signal contained in the image signal output from the tuner; and
   controller unit, coupled to said tuner and said image memory, transmitting a store command to said image memory a predetermined period of time after the sync-control signal is generated, and transmitting a switch command upon receipt of a channel change signal output from a channel selector, wherein the switch command transmitted by said controller unit controls a display switch such that the image signal stored in said image memory is displayed on a screen.

* * * * *